Patented Oct. 8, 1929

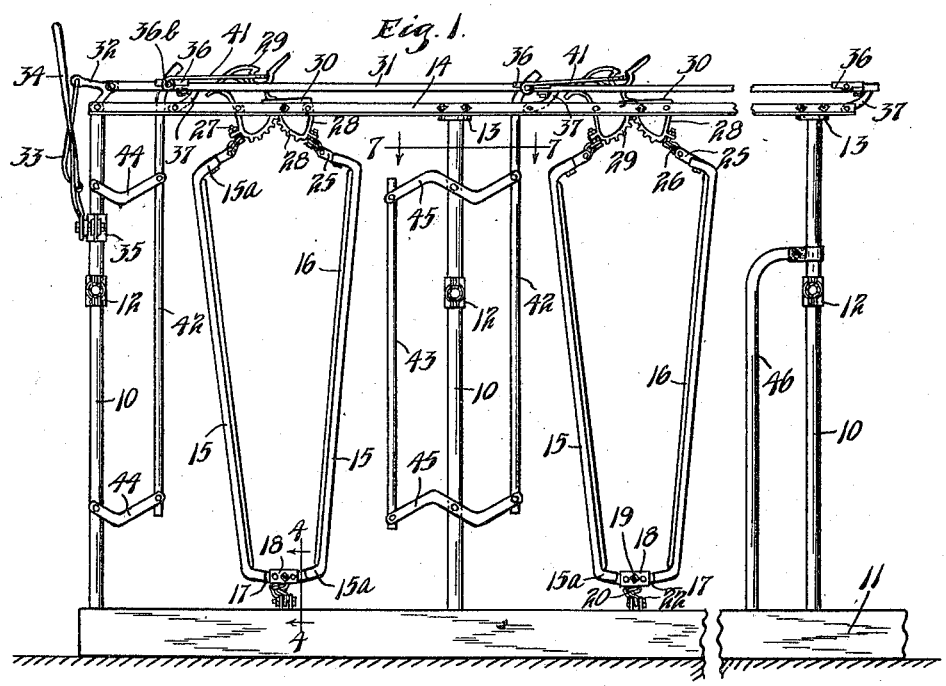
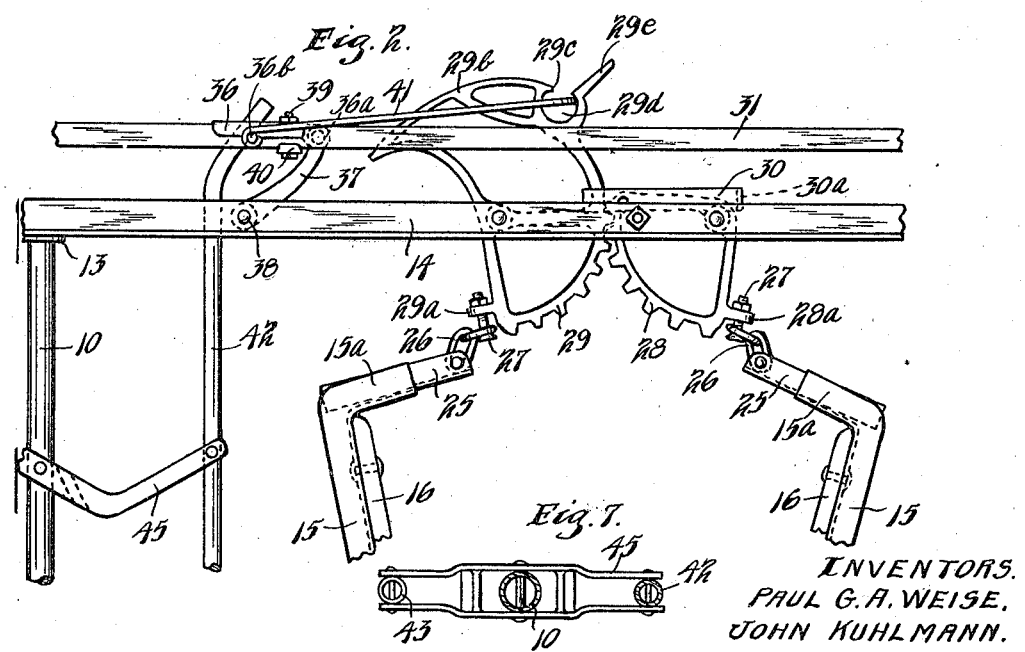

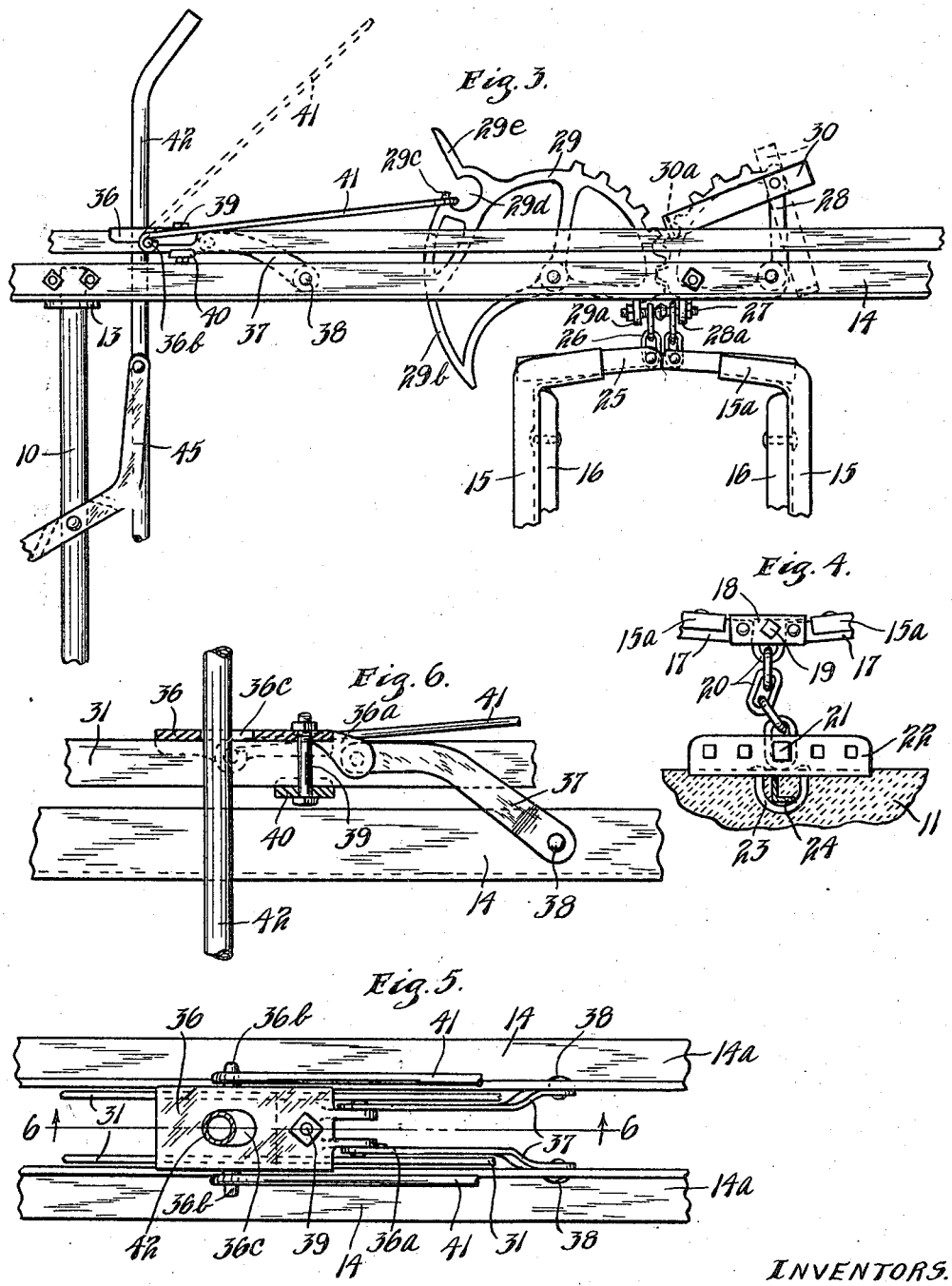

1,730,835

UNITED STATES PATENT OFFICE

PAUL G. A. WEISE AND JOHN KUHLMANN, OF LESTER PRAIRIE, MINNESOTA

CATTLE STANCHION

Application filed October 25, 1926. Serial No. 143,843.

This invention relates to a cattle stanchion. As is well known to those skilled in the art, cattle stanchions are now used in cattle barns or stables at the front of the stalls in which the animals are kept.

It is an object of this invention, therefore, to provide a cattle stanchion of simple and efficient construction, one which can be readily opened and closed and one which will have great freedom of movement when in closed position, so that the animal's movement will not be too greatly limited.

It is a further object of this invention to provide a plurality of cattle stanchions adapted to be opened and closed with one common operating means for simultaneously opening and closing all of said stanchions.

It is still another object of the invention to provide a plurality of cattle stanchions with means for simultaneously opening and closing the same, each of said stanchions being constructed and arranged so that it may be disconnected from the operating means so as not to be operated when the other stanchions are operated.

It is still another object of the invention to provide a plurality of cattle stanchions adapted to be opened and closed with a common operating means for simultaneously operating all of said stanchions, each of said stanchions being arranged to be disconnected from said operating means and each having manual means by which it can be separately operated.

It is also an object of the invention to provide a cattle stanchion comprising substantially vertical members having arms at their tops and bottoms extending towards each other, said bottom arms being pivotally connected together and said top arms being pivotally connected to a pair of swinging members so as to be swung toward and from each other to place said stanchion in closed or open position.

It is a further object of the invention to provide a stanchion as set forth in the preceding paragraph, in which the bottom arms are connected by a flexible means to a stationary support and the said top arms are connected to said swinging members by a flexible means whereby when the stanchion is in open position it cannot be swung about a vertical axis but when it is in closed position, it may be swung about a vertical axis through substantially 90°.

These and other objects and advantages of the invention will be fully set forth in the following description made in connection with the accompanying drawings, in which like reference characters refer to similar parts throughout the several views and in which:—

Fig. 1 is a view in side elevation of a stanchion structure;

Fig. 2 is a partial view of the structure shown in Fig. 1;

Fig. 3 is a view similar to Fig. 2, showing the parts in different positions, certain parts being shown in dotted lines;

Fig. 4 is a vertical section taken on line 4—4 of Fig. 1, as indicated by the arrows, the stanchion being swung through 90°;

Fig. 5 is a partial top plan view of the stanchion;

Fig. 6 is a vertical section taken on line 6—6 of Fig. 5, Figs. 2 to 6 being shown on an enlarged scale; and Fig. 7 is a horizontal section taken on line 7—7 of Fig. 1, as indicated by the arrows.

Referring to the drawings, a stanchion structure is shown comprising the spaced upright posts 10. While these posts may be variously formed, in the embodiment of the invention illustrated they are shown as cylindrical in form or as made from piping. The posts will be firmly secured at their lower ends, and, as shown, they are embedded in the curb 11 usually disposed in the front of the stalls, and which may be made of concrete. The stall partition members 12 are shown as clamped to the posts 10, which members 12 will extend rearwardly and downwardly from said posts. The upper ends of posts 10 have collars or circular flanges 13 secured thereto which support the top rail 14 of the stanchion frame. While this rail may be variously formed, in the embodiment of the invention illustrated it comprises a pair of angle bars 14$^a$ having vertical webs disposed towards or facing each other. Each stanchion proper comprises a pair of substantially vertical members 15 which may conveniently be made of channel members and which preferably will have wooden strips 16 secured to their inner faces, which strips may be riveted to the members 15 as illustrated. The channel members 15 have their upper and lower ends bent substantially at a right angle, forming top and bottom arms extending toward each other. The lower arms 15$^a$ have members 17 secured therein which are pivotally connected to a channel shaped yoke member 18 which embraces said members 17. A headed and nutted bolt 19 extends through the central portion of the member 18 and through the upper link of a chain 20, which link is disposed between the sides of member 18. The chain 20 is shown as comprising three intermediate links between the top link described and the lower link which embraces the headed and nutted bolt 21 extending through alined holes in the sides of the channel member 22 secured to the member 11, said channel shaped member being illustrated as having a clip 23 riveted thereto and embracing an angle bar 24 embedded in the concrete curb 11. The member 24 has a plurality of alined holes extending therethrough, through any of which the bolt 21 may pass. The lower end of the stanchion can thus be adjustably secured in the member 22. The top arms of the channel members 15 have the bars 25 secured therein having rivets in their ends embraced by the lower links of the chain members 26, said chain members comprising two links, the upper of which embraces the shank of the headed and nutted bolt 27. Bolts 27 are formed with beveled heads and pass through lugs 28$^a$ and 29$^a$ depending respectively from gear segments 28 and 29, which gear segments are arranged to mesh with each other and are pivotally mounted on rivets extending between the vertical webs of the angle bars 14$^a$. The gear segments 28 and 29 have teeth thereon through an arc of substantially 90°, and the member 29 has an arcuate cam surface 29$^b$ of substantially 90° in extent, said cam surface ending at its inner end in a tongue 29$^c$ projecting over a recess 29$^d$ having an outer opening adjacent the tongue 29$^c$ at the opposite side of which opening a handle 29$^e$ extends substantially radially outward. The gear segment 28 has a plate bar 30 pivotally connected to its outer corner, which bar has its end 30$^a$ bent substantially at a right angle so as to lie across the teeth of said segments when thrown to the position shown in full lines in Fig. 3.

An operating means for the stanchion is provided, including a pair of spaced bars 31, which bars are pivotally connected at one end of the top rail 14 to a bell crank lever 32, one arm of which is pivotally connected between the angle bars 14$^a$ of said rail, and the other end of which is pivotally connected to a link 33. The link 33 extends downwardly and is pivotally connected at its lower end to an intermediate point on an operating lever 34 which in turn is pivotally connected at its lower end to a bracket 35 clamped to the end post 10. Plate members 36 are provided extending across the tops of the bars 31 and having portions extending along the outer sides thereof, said plates having spaced lugs 36$^a$ projecting downwardly between the bars 31, having outwardly projecting integral pins on which are pivotally connected one end of links 37 which are pivotally connected to and between the vertical webs of the angle bars 14$^a$ by the headed rivets 38. The plates 36 are secured to bars 31 by bolts 39 extending downwardly through the center of said plates adjacent the lugs 36$^a$ and passing through small clips or plates 40 extending across the under sides of bars 31 and having vertical portions disposed at the outer sides thereof. The plates 36 have outwardly projecting pintle pins 36$^b$ at each side thereof which are embraced by eyelets at the free ends of a yoke member 41, the central or bight portion of which is adapted to be disposed in the recess 29$^d$ and to hook over tongue 29$^c$. One of the plates 36 is disposed at the end of the bars 31 opposite lever 32, which plate is connected by one of the arms 37 to the rail 14 as already described. Sure-stops are provided, comprising vertical rods 42 and 43. The rod 42 adjacent the end post 10 is pivotally connected thereto by the links 44 and said rod has a curved upper portion which extends through an elongated hole 36$^c$ in one of the plates 36. The rods 42 at the intermediate post 10 are pivotally connected to said post and to the rods 43 by the angular levers 45 disposed at each side of the post 10. A post 46 is secured in spaced relation to the end post 10 opposite the end post carrying the lever 34 also forming a sure-stop.

In operation, when it is desired to open the stanchion, the lever 34 will be thrown to the upper position shown in Fig. 1. This oscillates lever 32 to the position as shown in Fig. 1 and moves bars 31 to the right. The yokes 41 are disposed in the recesses 29$^b$ and push against the sides of said recesses adjacent the handles 29$^e$, thus oscillating the segments 29. This, owing to the meshing teeth on said segments, also oscillates the segment 28 so that the segments move to the position shown in Fig. 1. The upper ends of the members 14 are thus swung apart, thus opening the stanchion for the entry of the animal's head as shown in Fig. 1. As the bars 31 and plates 36 move to the right, the rods 42 were also moved downward to the position shown in Fig. 1. It will be seen that the rods 42 will drop by gravity to the position shown in Fig. 1 when plates 36 move to the right. These rods and the rods 43 thus form stops preventing the animals passing between the stanchions. When it is desired to close the stanchions, the lever 34 will be swung to its downward position. The bight portions of yokes 41 engage the sides of the recesses 29$^d$ adjacent the tongues 29$^c$ and rotate the segments 29 in a counter-clockwise direction. This swings the segments 28 and 29 to the position shown in Fig. 3 thus bringing the top ends of the members 15 together and closing the stanchions. When bars 31 are moved to the left, the upper curved ends of rods 42 are cammed upward by the ends of the holes 36$^e$ in the plates 36 and lifted so that said rods move to the position shown in Fig. 3. It will be noted that when the stanchions are in open position, very little movement thereof about a vertical axis is permitted. When the stanchion is closed, however, the same can be swung about a vertical axis through 90° or more. The links of the chains 26 and 20 accommodate this movement. If it is desired not to operate one of the stanchions, the yoke 41 is merely moved out of the recess 29$^d$ and may then be swung to extend in the opposite direction from that shown in Fig. 3. When the lever 34 and the bars 31 are operated, the particular stanchion will thus not be operated and may remain in closed or open position. It will also be seen that each stanchion may be at any time manually operated by moving segments 29 by means of the handle 29$^e$. After a stanchion has been disconnected and it is desired again to operate the same with lever 34, the yoke 41 need merely be thrown to the right as shown in Fig. 1. The end of the yoke will thus ride up on the cam surface 29$^b$ and automatically drop into the recess 29$^d$ where it will again be in position to operate the stanchion. If it is desired to lock the stanchion in closed position, the member 30 is thrown over to the full line positon shown in Fig. 3. The bent end of this member extends across the teeth of the gear segments and will be engaged by the teeth of segment 29 and prevent its oscillation. The bar 30 can be used to lock all of the stanchions in position or any one stanchion may be locked by disconnecting its yoke 41.

From the above description it is seen that applicant has provided a very simple and efficient stanchion structure. The parts are comparatively few and are easily made and assembled. The stanchions can be all simultaneously operated as described, or any one or more of the stanchions may be disconnected and held in closed or open position. The stanchions can also be readily locked in closed position when desired. The lever 34 is very easily operated and the weight of the surestop bars 42 give the stanchions a tendency to move to open position. It will be seen that the lever 34 is arranged so that it swings across a dead-center with link 33 so that it is locked in its downward position with the stanchions closed and said stanchions cannot be opened by any pressure exerted upon the sides thereof. The stanchion has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the novel parts and combinations of parts disclosed and defined in the appended claims.

What is claimed is:—

1. A stanchion structure having in combination, a frame, a pair of substantially vertical members between which the animal is held, said members having arms at their tops and bottoms bent toward each other, said bottom arms on said members being pivotally connected, a chain connecting said bottom arms to a stationary support, chains connected to said top arms respectively and meshing gear segments mounted on said frame to which said last mentioned chains are respectively connected, said gear segments being oscillatably mounted and one of them being provided with an operating means whereby said top arms may be moved toward and from each other to close and open said stanchion, said vertical members being rotatable bodily about a vertical axis when said stanchion is in closed position.

2. A stanchion structure having in combination, a frame, a plurality of alined stanchions each comprising a pair of spaced vertical members engaging swinging members mounted in said frame above each stanchion respectively connected to the vertical members thereof for moving said stanchions to open and closed position, an operating member extending along said frame, links carried by said member and adapted to be detachably engaged with one of the swinging members of each pair, and a lever at the end of said frame to which said operating member is connected.

3. A stanchion structure having in combination, a frame, a plurality of stanchions each comprising a pair of spaced vertical members, a pair of meshing gear segments oscillatably mounted in said frame above each of said stanchions and pivotally connected respectively to the vertical members thereof, one of said gear segments of each pair having a recess therein, an operating member movable along said frame, links carried by said operating member and adapted to have their ends removably disposed respectively in said recesses and an operating means for moving said operating member whereby said stanchions may be simultaneously operated or said link may be disconnected from one of said gear segments and said particular stanchion not operated.

4. The structure set forth in claim 3, said frame comprising a vertical post between each pair of stanchions, sure-stop means mounted on said posts including a rod extending upwardly and operatively connected to said operating member whereby when the stanchions are moved to open position, said sure-stop will be moved to operative position.

5. A stanchion structure having in combination, spaced vertical posts, a frame member extending along the top thereof, a plurality of stanchions disposed respectively between said posts, each stanchion comprising spaced vertical members, a pair of inter-engaging oscillating members mounted on said frame member above each pair of stanchions and connected to the vertical members thereof respectively, an operating means extending along said frame member, connecting members connected to said operating means and adapted removably to be connected to one of the inter-engaging members of each of said pairs, said inter-engaging member comprising cam means adapted to connect said connecting member to said inter-engaging member upon movement of said operating means.

6. A stanchion structure having in combination, spaced vertical posts, a top rail connecting said posts comprising a pair of angle bars having their vertical webs adjacent each other, a plurality of stanchions disposed between said posts, each comprising a pair of relatively movable substantially vertical members, a pair of gear segments oscillatably mounted between said angle bars disposed respectively above each stanchion and respectively pivotally connected to the vertical members thereof, one of said gear segments comprising a recess having an opening at its outer side, and a cam surface extending at one side of said recess, an operating member extending above said top rail, a plurality of link members pivotally connected at one end to said operating member and adapted to have their other ends disposed in said recesses respectively and an operating lever secured to the end one of said posts and connected to said operating member for moving the same longitudinally and opening and closing said stanchion.

7. The structure set forth in claim 6, one of said gear segments having an operating handle extending therefrom whereby each stanchion may be manually operated separately when said yoke member is disconnected from said segment.

8. The structure set forth in claim 6, one of said gear segments having a locking member thereon adapted to be thrown to operative and inoperative position.

9. The structure set forth in claim 6, said operating means having plate members connected thereto, with openings therein, sure-stop means pivotally connected to said posts and comprising an operating rod having an upper curved end extending through said openings in said plate members whereby said sure-stop means are operated when said stanchions are operated.

10. A stanchion structure having in combination, a frame, a pair of substantially vertical members between which the animal is held, said members being pivotally connected at their lower ends and means for swinging said members toward and from each other including oscillating meshing gears mounted on said frame and operatably connected respectively to said members one of said gears having a recess therein and a cam surface adjacent said recess adapted to cooperate with an operating means.

11. A stanchion structure having in combination, a frame, a pair of substantially vertical members between which the animal is held, said members being pivotally connected at their lower ends and means for swinging said members toward and from each other including oscillating meshing gears mounted on said frame and operatably connected respectively to said members one of said gears having a recess therein and a cam surface adjacent said recess adapted to cooperate with an operating means, and having a handle projecting therefrom for manual operation of said members.

12. A stanchion structure having in combination, a rigid frame having a stationary horizontal bar, a pair of meshing gear segments mounted for oscillation in said bar, a pair of substantially vertical members between which the animal is held, said members being swingably mounted on said segments, one of said segments having an operating means thereon, and means for oscillating said segments to move said members toward and from each other.

13. A stanchion structure having in combination, a frame comprising a stationary horizontal bar, a pair of meshing gears mounted on said bar for oscillation about axes fixed in relation to each other and to said frame, a pair of substantially vertical members between which the animal is held swingably connected at their upper ends to said segments for movement about a substantially vertical axis and means for swinging said gears about their axes to move said members toward and from each other.

14. A stanchion structure having in combination a frame comprising a stationary horizontal bar, a pair of gears mounted on said bar for oscillation about axes fixed in relation to each other and to said bar, a pair of substantially vertical members between which the animal is held, flexible means connecting the upper ends of said members and said gears, and means for oscillating said gears to move said members toward and from each other.

In testimony whereof we affix our signatures.

PAUL G. A. WEISE.
JOHN KUHLMANN.